US011929070B1

(12) United States Patent
Sarikaya et al.

(10) Patent No.: US 11,929,070 B1
(45) Date of Patent: Mar. 12, 2024

(54) MACHINE LEARNING LABEL GENERATION

(71) Applicant: Amazon Technologies, Inc., Seattle, WA (US)

(72) Inventors: Ruhi Sarikaya, Redmond, WA (US); Zheng Du, Bellevue, WA (US); Xiaohu Liu, Bellevue, WA (US); Kai Liu, Redmond, WA (US); Sriharsha Venkata Chintalapati, Hyderabad (IN); Chenlei Guo, Redmond, WA (US); Hung Tuan Pham, Kirkland, WA (US); Joe Pemberton, Seattle, WA (US); Zhenyu Yao, Sammamish, WA (US); Bigyan Rajbhandari, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 17/461,124

(22) Filed: Aug. 30, 2021

(51) Int. Cl.
*G10L 15/22* (2006.01)
*G06N 20/20* (2019.01)
*G10L 15/02* (2006.01)
*G10L 15/06* (2013.01)

(52) U.S. Cl.
CPC .............. *G10L 15/22* (2013.01); *G06N 20/20* (2019.01); *G10L 15/02* (2013.01); *G10L 15/063* (2013.01); *G10L 2015/225* (2013.01)

(58) Field of Classification Search
CPC ........ G10L 15/22; G10L 15/02; G10L 15/063
See application file for complete search history.

(56) References Cited

U.S. PATENT DOCUMENTS 10,446,144 B2 * 10/2019 Aggarwal ............... G10L 15/30
10,719,780 B2 * 7/2020 Lee ......................... G06N 20/00

* cited by examiner

Primary Examiner — Ibrahim Siddo
(74) Attorney, Agent, or Firm — Pierce Atwood LLP

(57) ABSTRACT

Techniques for performing centralized unsuperivised learning in a multi-domain system are described. A user may request labeled data for an ML task, where the request includes a prompt for obtaining relevant explicit user feedback. The system may use the prompt to collect explicit user feedback for relevant runtime user inputs. After a duration of time (in the user's request for labeled data) has elapsed, the system determines whether collected user feedback indicates processing of the user input was defective and, if so, determines a cause of the defective processing. The system then uses one or more label generators to generate labeled data using the collected user feedback, whether the processing was defective, and the determined defect cause.

20 Claims, 9 Drawing Sheets

US 11,929,070 B1

MACHINE LEARNING LABEL GENERATION

BACKGROUND

Machine learning is a computing technique whereby a computing system can learn how to perform a specific task without explicitly being programmed to do so. Machine learning may be used to handle a number of different tasks of varying complexity. Machine learning computing may rely on models that are trained using data sets. Once trained, a machine learning model may be capable of processing input data and producing output data that conforms to the function for which the model has been trained.

BRIEF DESCRIPTION OF DRAWINGS

For a more complete understanding of the present disclosure, reference is now made to the following description taken in conjunction with the accompanying drawings.

DETAILED DESCRIPTION

Figure 1:
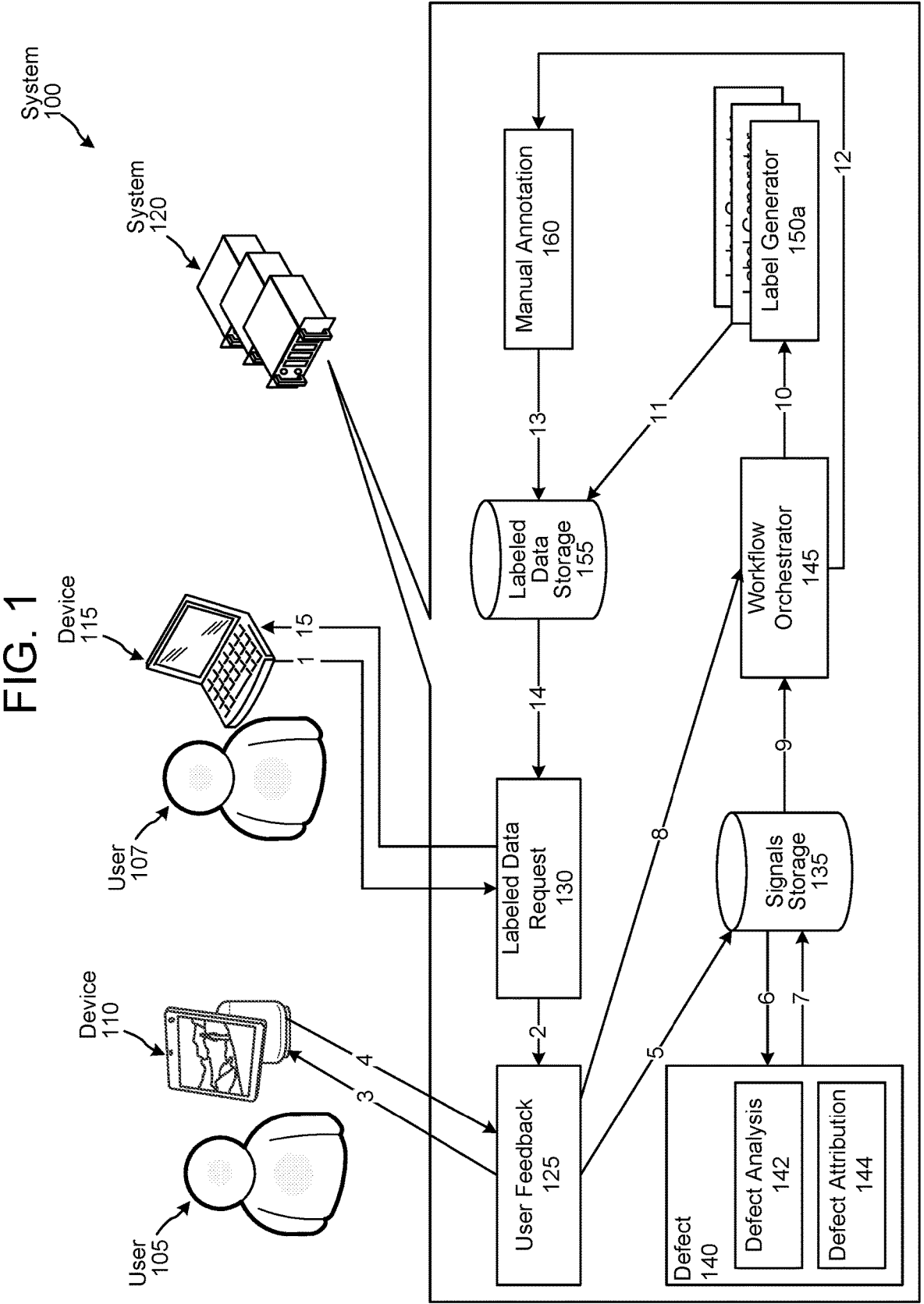
FIG. 1 is a conceptual diagram illustrating a system configured to selectively obtain user feedback regarding runtime machine learning (ML) model processing, and use label generators to generate labeled data for training of the runtime ML model, according to embodiments of the present disclosure.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, and predictive analyses.

Trained models come in a variety of forms including trained classifiers, Support Vector Machines (SVMs), neural networks (such as deep neural networks (DNNs), recurrent neural networks (RNNs), and convolutional neural networks (CNNs)), random forests, isolation forests, and others. As an example, a neural network typically includes an input layer, an output layer and one or more intermediate hidden layers. The input layer is configured to take in one or more certain kinds of data and the output layer is configured to output a desired kind of data to result from the network. The hidden layer(s) performs a variety of functions to generate output data from the input data.

As part of training a ML model, one or more labels are applied to data, resulting in labeled data. The labels are typically unique to the task to be performed by the ML model. For example, to train a ML model to transcribe speech into text, audio data of the speech may be labeled with text data corresponding to the words in the speech. As another example, to train a ML model to determine an intent of a natural language input, data (e.g., natural language text data) corresponding to the input may be labeled with an intent of the input. In some instances, a human may manually label data, for training, based on the human's knowledge of the task to be performed by the ML model.

As ML models are trained to perform specific tasks, labeling of data for training one ML model may be different from labeling of data for training another ML model. For example, a human may generate a first type of label for training a first ML model, and a second type of label for training a second ML model.

The present disclosure provides a centralized approach to generating labeled data for training of various different ML tasks of a system. The labeled data may be used for ML model generation, training, updating, evaluation, and optimization, as well as training of human annotators.

A system of the present disclosure leverages implicit and explicit user feedback to generate labeled data at scale and in near real-time. As used herein, "implicit user feedback" refers to user feedback that is implied by a system based on some action of a user. For example, a system may determine implicit user feedback based on a user making certain sounds (e.g., sighing, giggling, etc.), a user interrupting output of content with another user input, a user requesting output of content be stopped/canceled, a user indicating a particular sentiment or emotion during output of content, etc. As used herein, "explicit user feedback" refers to a user feedback specifically provided in response to a prompt for such feedback by a system. For example, after outputting content, a system may cause a device to output the synthesized speech "did I answer your question," "did I respond correctly," or a similar natural language output requesting feedback from the user. The user may respond to such an output by saying "yes" (or another similar affirmative response) or "no" (or another similar negative response), or by providing feedback in other input forms, such as via a touchscreen of the device, by performing a gesture (e.g., thumbs up, thumbs down, etc.) that is captured by a camera of the device, providing a facial expression (e.g., a smile, a frown, etc.) that may be captured by a camera of the device, selecting a button on the device, etc.

A user (for example tasked with updating a ML model) may request the system to generate labeled data for a particular ML task performable by the ML model. As part of the request, the user may provide a prompt to be used by the system to gather explicit user feedback specifically relating to runtime processing corresponding to the ML task. As such, the user may indicate to the system how the system should prompt users for obtaining explicit user feedback usable to generate the labeled data for updating the ML model with respect to the ML task. The system may aggregate explicit user feedback, and use one or more label generators to generate labeled data using the aggregated user feedback. In some embodiments, the system is configured with multiple label generators configured to generate labeled data for ML training, where each label generator is configured to generate labeled data for a specific ML task. For example, the system may implement one label generator to generate labeled data for training a ML model to transcribe a speech into text or other meaning representation data, another label generator to generate labeled data for training a ML model to perform intent classification of user inputs, another label generator to generate labeled data for training a ML model to perform gesture detection, etc. The system may selectively input aggregated user feedback data (and other related data) into a label generator configured to generate labeled data for the ML task requested by the user.

The teachings of the present disclosure improve user privacy as the teachings of the present disclosure may decrease the amount of manual annotation used to generate labeled data for ML model training. The teachings of the present disclosure also increase a speed at which ML models may be generated/updated as teachings of the present disclosure may be performed in near real-time of receiving user feedback.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to selectively obtain user feedback regarding runtime ML model processing, and use label generators to generate labeled data for ML training of the runtime ML model. Although the figures and discussion of the present disclosure illustrate certain processes in a particular order, the processes described may be performed in a different order (as well as certain processes removed or added) without departing from the present disclosure.

Figure 9:
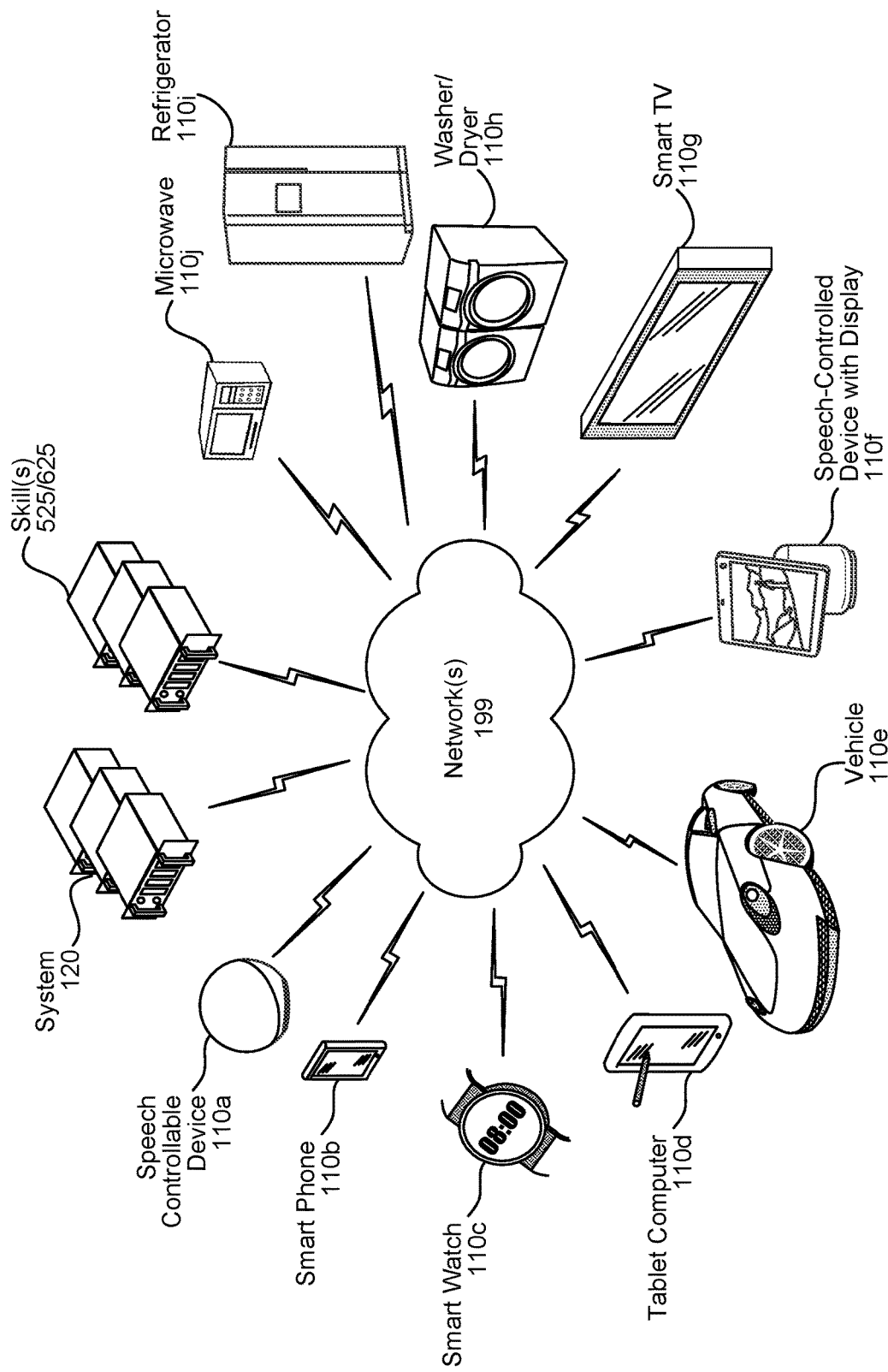
FIG. 9 illustrates an example of a computer network for use with the overall system, according to embodiments of the present disclosure.

The system 100 may include a device 110 (local to a user 105), a device 115 (local to a user 107), and a system 120 in communication across a network(s) 199 (illustrated in FIG. 9). The network 199 may include the Internet and/or any other wide- or local-area network, and may include wired, wireless, and/or cellular network hardware.

The user 107 may want to receive labeled data for one or more ML tasks. The user 107 may use the device 115 to request generation of the labeled data by the system 120. As an example, the user 107 may be an individual tasked with generation, evaluation, and/or optimization of a ML model implemented by the system 120 or another system. In some embodiments, the user 107 may provide input to the device 115 via a physical or displayed keyboard of or associated with the device 115.

The user 107 may include, within the request for labeled data, an indication of the ML task(s) for which labeled data is requested. Example ML tasks include speech transcription, gesture detection, intent classification, object recognition, user recognition, skill selection, and device arbitration. It will be appreciated that the foregoing examples are merely illustrative, and that other ML tasks are envisioned and within the scope of the present disclosure.

Along with the ML task(s), the request for labeled data may include one or more prompts to be used by the system 120 to obtain explicit user feedback usable to generate the labeled data for the specific ML task(s). In some embodiments, the user 107 may provide a natural language prompt that may be output as synthesized speech. For example, if the ML task is speech transcription, the prompt may request user feedback confirming whether speech transcription of a user input was correct (e.g., "did you say [ASR hypothesis for the user input]"). For further example, if the ML task is device arbitration, the prompt may request user feedback confirming whether the system 120 used the correct device to output a response to a user input (e.g., "did I respond using the correct device"). In another example, if the ML task is skill selection, the prompt may request user feedback confirming whether the system 120 responded to a user input using a correct skill (e.g., "did I respond using the correct skill").

In addition to the ML task(s) and the prompt(s), the request for labeled data may include sampling logic representing how the system 120 should obtain explicit user feedback for the request. The sampling logic may indicate, for example, that the system 120 is to request explicit user feedback from users corresponding to one or more user demographics (e.g., geographic location, spoken language, age, gender, etc.), that the system 120 is to request explicit user feedback when the device that captured a user input corresponding to a particular device type (e.g., headless device, device including a display, etc.), that the system 120 is to request explicit user feedback when a particular skill is used to respond to a user input, that the system 120 is to request explicit user feedback when the system 120 determines a user input corresponds to a particular intent, etc. The sampling logic may be based on the type of ML task for which labeled data is being requested.

The request for labeled data may additionally or alternative include data indicating, for example, whether the requested labeled data is to be generated using manual annotation, a budget allotted for manual annotation, whether the requested labeled data is to be generated using a label generator 150, at what frequency the system 120 is to request explicit user feedback using the provided prompt(s), and a duration that the system 120 should request explicit user feedback for generating the requested labeled data (e.g., a day, a week, two weeks, etc.).

The device 115 sends (step 1), and a labeled data request component 130 of the system 120 receives, request data 205 (illustrated in FIG. 2) corresponding to the request for labeled data. The request data 205 may include data representing the one or more ML tasks with respect to which labeled data is requested, the one or more prompts for requesting explicit user feedback as indicated by the user 107, any sampling logic the user 107 may have provided, and any other information the user 107 may have provided for the request (e.g., a duration for collective explicit user feedback, etc.).

In some embodiments, a runtime ML model may be associated with a ML model output confidence component configured to determine a confidence that the output, of the runtime ML model, is correct. If the ML model output confidence component determines the confidence indicates the runtime output is likely incorrect (e.g., the confidence fails to satisfy a threshold confidence), then the ML model output confidence component may generate and send, to the labeled data request component 130, the request data 205 described above with respect to step 1, except that the request data 205 may be generated by the ML model output confidence component rather than the user 107.

Figure 2:
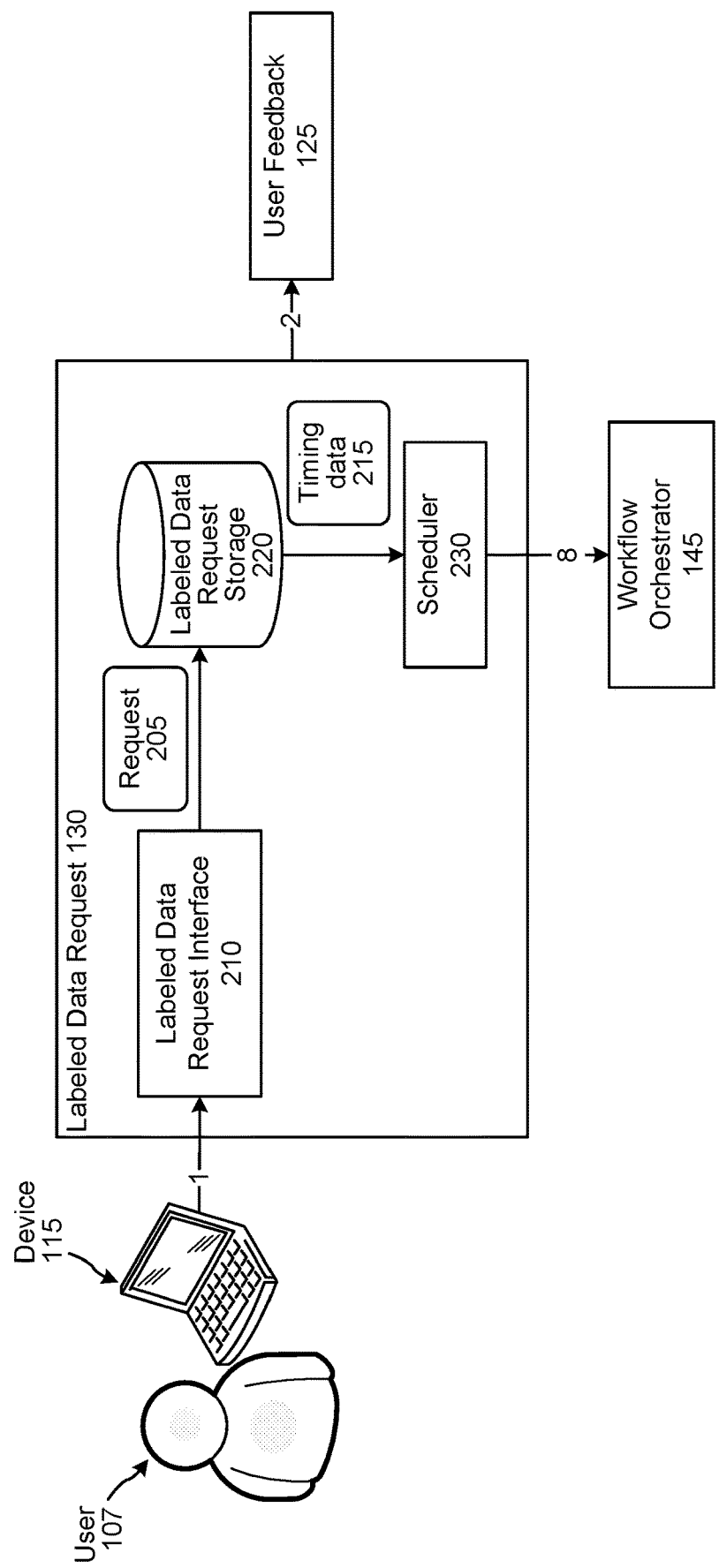
FIG. 2 is a conceptual diagram illustrating a labeled data request component, according to embodiments of the present disclosure.

As illustrated in FIG. 2, the request data 205 may be input to the labeled data request component 130 via a labeled data request interface 210. The labeled data request interface 210 may store the request data 205 in a labeled data request storage 220 of the labeled data request component 130. The labeled data request storage 220 may store various instances of request data, with each instance of request data indicating the user that generated the request for labeled data, the ML task(s) for which labeled data is to be generated, one or more prompts for requesting explicit user feedback regarding performance of the ML task at runtime, a duration (e.g., a day, a week, two weeks, etc.) that explicit user feedback is to be requested using the prompt(s), and potentially other sampling logic (e.g., user demographics with respect to which explicit user feedback is to be requested, geographic locations of users with respect to which explicit user feedback is to be requested, etc.). The labeled data request component 130 may also include a scheduler component 230. The scheduler component 230 is configured to query the labeled data request storage 220 for timing data 215 representing when explicit user feedback is to no longer be requested for a request for labeled data. For example, the timing data 215 may include a timestamp representing receipt of request data from the device 115, and a duration (e.g., a day, a week, two weeks, etc.) that explicit user feedback is to be requested based on the prompt(s) and other sampling logic in the request data. When the scheduler component 230 determines, based on the timing data 215, that explicit user feedback is to no longer be requested for a request for labeled data, the scheduler component 230 may send (step 8), to a workflow orchestrator component 145 of the system 120, data representing the ML task(s) (represented in the request data 205 corresponding to the timing data 215 in the labeled data request storage 220). Details of processing of the workflow orchestrator component 145, in response to receiving such data, are described herein below.

Once the labeled data request interface 210 receives the request data 205, and optionally stores the request data 205 in the labeled data request storage 220, the labeled data request component 130 may send (step 2) the request data 205 to a user feedback component 125 of the system 120.

Figure 3:
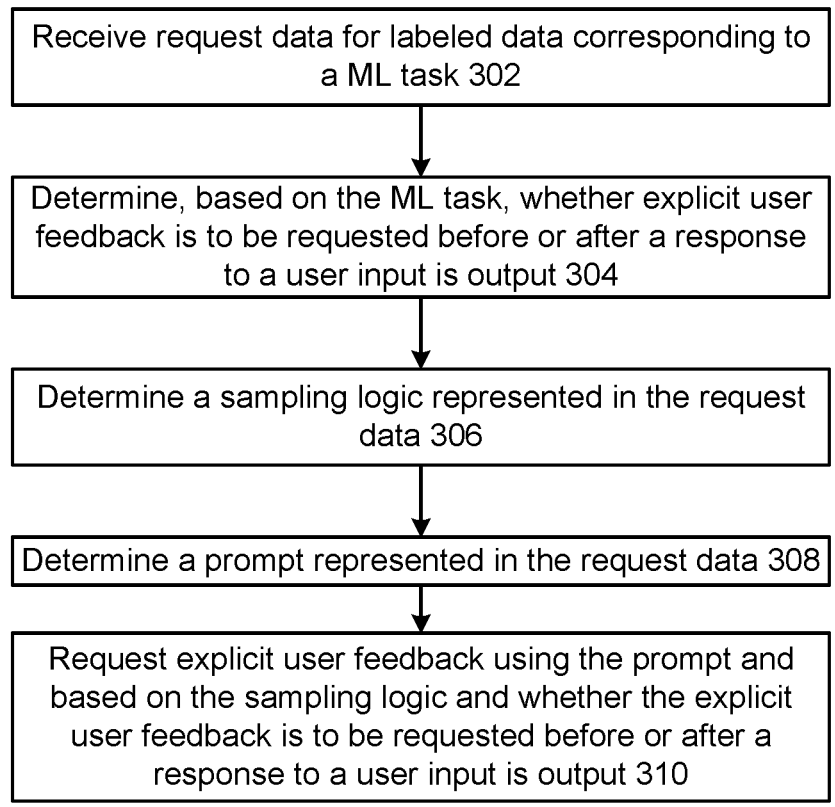
FIG. 3 is a process flow diagram illustrating processing that may be performed by a user feedback component, according to embodiments of the present disclosure.

Referring to FIG. 3, in response to receiving (step 302) the request data from the labeled data request component 130, the user feedback component 125 may determine (step 304), based on the ML task in the request data, whether explicit user feedback is to be requested before or after a response to a user input is output. For example, if the ML task is an ASR processing task, the user feedback component 125 may deter explicit user feedback is to be requested prior to a response to a user input being output (e.g., in the form of "did you say [ASR hypothesis of the user input]"). For further example, if the ML task is a gesture detection task, the user feedback component 125 may determine explicit user feedback is to be requested prior to a response to a gesture being output. As another example, if the ML task is a skill selection task, the user feedback component 125 may determine explicit user feedback is to be requested after a response to a user input is output (e.g., in the form of "did I respond correctly").

The user feedback component 125 also processes the request data 205 to determine (306) a sampling logic represented therein. For example, the user feedback component 125 may determine the request data 205 indicates explicit user feedback is to be requested from users corresponding to a specific geographic location. For further example, the user feedback component 125 may determine the request data 205 indicates explicit user feedback is to be requested for a duration of time (e.g., a week).

The user feedback component 125 may periodically check and tally a number of explicit user feedbacks (requested based on request data) against a total number of requests that are permitted as indicated in the request data. Once the number of requested explicit user feedbacks reaches the total number, the user feedback component 125 may cease requesting explicit user feedback with respect to the request data.

The user feedback component 125 may also determine (step 308) a prompt, for requesting explicit user feedback, represented in the request data 205.

The user feedback component 125 may request (step 310) explicit user feedback using the prompt and based on the sampling logic and whether the explicit user feedback is to be requested before or after a response to a user input is output. The user feedback component 125 may generate one or more types of output data for requesting explicit user feedback. For example, the output data may include audio data, including synthesized speech requesting the explicit user feedback, and/or display data (e.g., text data, one or more graphical elements, such as virtual buttons, etc.) requesting explicit user feedback.

Referring again to FIG. 1, the user feedback component 125 may send (step 3) the output data (requesting explicit user feedback) to the device 110 with respect to which the ML task(s) was performed during processing of a user input. For example, if the request data 205 indicates an ASR task, the user feedback component 125 may send the output data to a device 110 from which a spoken user input was received. For further example, if the request data 205 indicates a gesture detection task, the user feedback component 125 may send the output data to a device 110 from which a gesture user input was received. In another example, if the request data 205 indicates an ASR task and a geographic location, the user feedback component 125 may send the output data to a device 110 corresponding to the geographic location and from which a spoken user input was received.

The device 110 may output the prompt (in the output data) and thereafter collect explicit user feedback. The user 105 may provide explicit user feedback in various forms. For example, the user 105 may say "yes" (or another similar affirmative response) or "no" (or another similar negative response), select a GUI element displayed on a touchscreen of the device, perform a gesture (e.g., thumbs up, thumbs down, etc.) that is captured by a camera of the device 110, providing a facial expression (e.g., a smile, a frown, etc.) that may be captured by a camera of the device 110, etc. The device 110 may send (step 4) user feedback data to the user feedback component 125, which may be stored (step 5) in a signals storage 135 of the system 120.

In some situations, the user feedback component 125 may derive implicit user feedback. For example, the user feedback component 125 may determine implicit user feedback based on a user making certain sounds (e.g., sighing, giggling, etc.) while the device 110 outputs a response to a user input, a user interrupting output of a response to a user input with another user input, a user requesting output of a response to a user input be stopped/canceled, a user indicating a particular sentiment or emotion during output of a response to a user input, etc. The user feedback component 125 may generate user feedback data representing implicit user feedback, and store (step 5) same in the signals storage 135.

The user feedback component 125 may be configured to receive all instances of user feedback data from all devices configured to communicate with the system 120 for purposes of responding to user inputs. In response to receiving user feedback data, the user feedback component 125 may store the user feedback data in the signals storage 135.

Each instance of explicit user feedback, stored in the signals storage 135, may be associated with a user input identifier identifying the user input with respect to which the explicit user feedback was provided, and the user feedback prompt that was output to request the explicit user feedback. Each instance of implicit user feedback, stored in the signals storage 135, may be associated with a user input identifier identifying the user input with respect to which the implicit user feedback was derived, and the one or more signals from which the implicit user feedback was derived. In some embodiments, an instance of user feedback, in the signals storage 135, may be associated with an indication of whether the user feedback is positive or negative. In some embodiments, an instance of user feedback, in the signals storage 135, may be associated with an indication of whether the user feedback is explicit or implicit.

Upon the user feedback component 125 storing explicit and/or implicit user feedback data in the signals storage 135, the user feedback data may be sent (step 6) to a defect component 140 of the system 120. In other words, the user feedback data may be communicated to the defect component 140 in near-real time of the user feedback component 125 receiving the user feedback data.

The defect component 140 includes a defect analysis component 142 and a defect attribution component 144. The defect analysis component 142 is configured to determine whether processing of a user input was successful or defective based on explicit and/or implicit user feedback corresponding to the user input. As used herein, "successful" processing if a user input occurs when the user is satisfied with the output presented in response to the user input. Conversely, as used herein, "defective" processing if a user input occurs when the user expresses some frustration with the output presented in response to the user input. Examples of positive user feedback may be the user saying "thank you," the user smiling or nodding the user's head, the user showing a thumbs up gesture, the user providing another input to continue the dialog, etc. Examples of negative user feedback may be the user saying "that's not what I wanted," the user interrupting the output by saying "cancel" or "stop," the user frowning or shaking the user's head, the user showing a thumbs down gesture, the user rephrasing or repeating the user input, etc.

To determine whether processing of a user input was successful or defective, the defect analysis component 142 may take into consideration all user feedback instances received for the user input from the signals storage 135 (e.g., all received user feedback data associated with a single user input identifier). In some embodiments, the defect analysis component 142 may process, using a ML model, the user feedback data (associated with a single user input identifier) to determine a value representing whether processing of the user input was successful or defective. No single instance of user feedback may be dispositive as to whether the processing was successful or defective. In other words, the ML model may take into consideration all instances of user feedback, received for a user input, when determining whether processing of the user input was successful or defective.

Even though no single instance of user feedback may be dispositive, the ML model may weight different types of user feedback differently. For example, in some embodiments the ML model may weight explicit user feedback heavier than implicit user feedback when determining whether processing of a user input was successful or defective.

When the defect analysis component 142 generates a value representing processing of the user input was defective, the defect attribution component 144 may execute to determine a cause of the defective processing. In some embodiments, the defect attribution component 144 may determine the user input identifier is associated with explicit user feedback in the signals storage 135, determine a ML task associated with the explicit user feedback in the signals storage 135, and determine processing of the user input was defective due to the runtime performed ML task. For example, the defect attribution component 144 may determine a spoken user input identifier is associated with explicit user feedback in the signals storage 135, determine an ASR task is associated with the explicit user feedback in the signals storage 135 (e.g., due to the request data 205 received at step 1 indicating the ASR task), and determine the ASR processing of the spoken user input was defective. For further example, the defect attribution component 144 may determine a spoken user input identifier is associated with explicit user feedback in the signals storage 135, determine an intent classification task is associated with the explicit user feedback in the signals storage 135 (e.g., due to the request data 205 received at step 1 indicating the intent classification task), and determine the intent classification processing of the spoken user input was defective.

Figure 4:
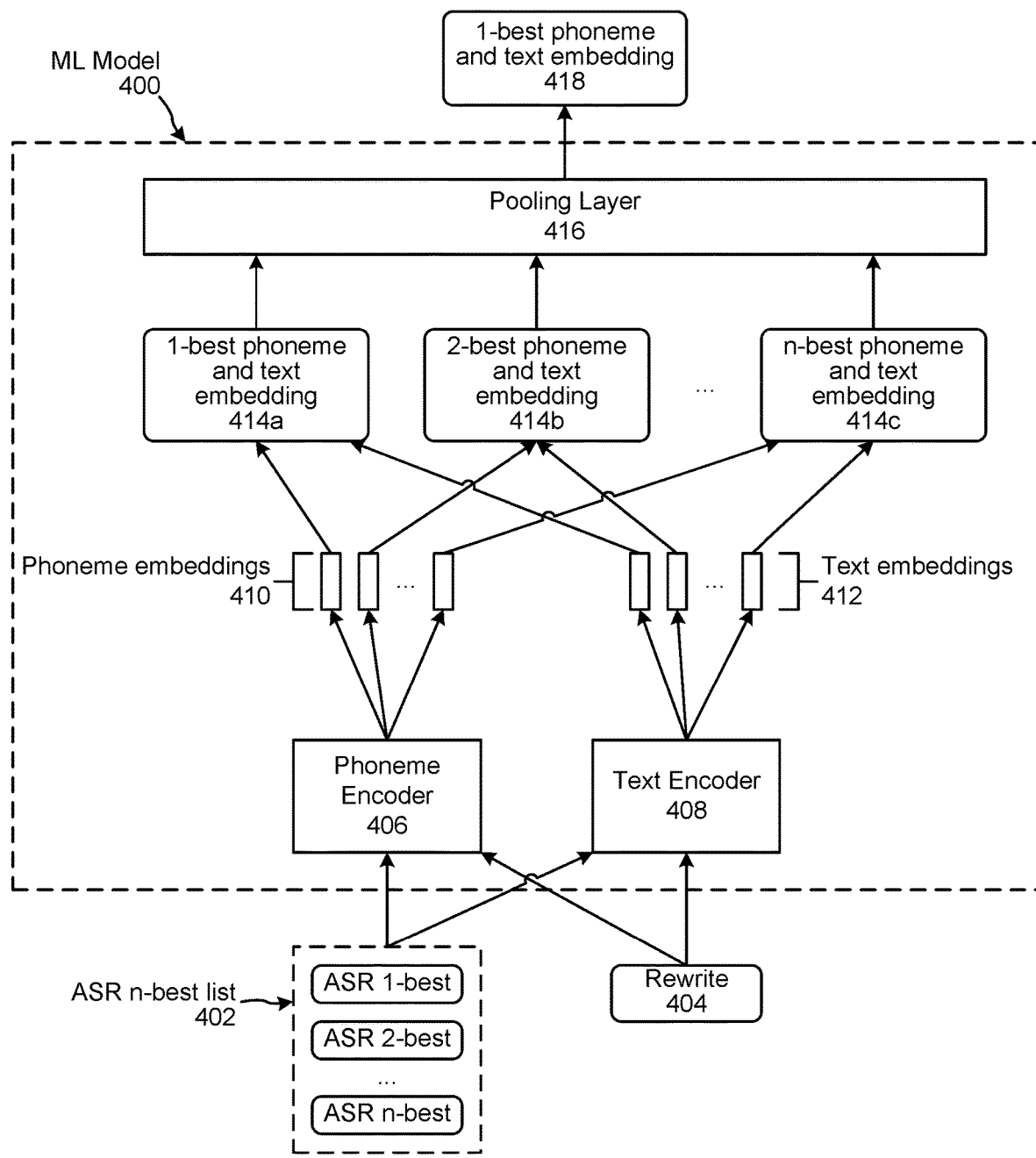
FIG. 4 is a conceptual diagram of a ML model for determining automatic speech recognition (ASR) error attribution, according to embodiments of the present disclosure.

In some embodiments, the defect attribution component 144 may implement a ML model configured to attribute defective processing of a user input to a particular type of processing that was performed with respect to the user input. FIG. 4 illustrates an example ML model 400 for determining whether ASR processing of a user input was defective.

As illustrated in FIG. 4, the ML model 400 may include a phoneme encoder 406, a text encoder 408, and a pooling layer 416. An ASR n-best list 402 (including an ASR 1-best hypothesis, an ASR 2-best hypothesis, . . . and an ASR n-best hypothesis generated at runtime for the spoken user input currently being processed by the defect attribution component 144) is input to the phoneme encoder 406 and the text encoder 408.

The system 120 may be configured with an ASR rewrite component configured to generate at least a first rewrite 404 of one or more ASR hypotheses represented in the ASR n-best list 402. The rewrite 404 is input to the phoneme encoder 406 and the text encoder 408.

The phoneme encoder 406 is configured to generate phoneme embeddings 410 for the ASR n-best list 402 and the rewrite 404. For example, the phoneme encoder 406 may generate a first phoneme embedding 410a for the ASR 1-best hypothesis, a second phoneme embedding 410b for the ASR 2-best hypothesis, a third phoneme embedding 410c for the ASR n-best hypothesis, and a fourth phoneme embedding 410d for the rewrite 404. Phoneme encoders are known in the industry/art, any one of which may be implemented as the phoneme encoder 406.

The text encoder 408 is configured to generate text embeddings 412 for the ASR n-best list 402 and the rewrite 404. For example, the text encoder 408 may generate a first text embedding 412a for the ASR 1-best hypothesis, a second text embedding 412b for the ASR 2-best hypothesis, a third text embedding 412c for the ASR n-best hypothesis, and a fourth text embedding 412d for the rewrite 404. Text encoders are known in the industry/art, any one of which may be implemented as the text encoder 408.

The ML model 400 may generate a phoneme and text embedding 414 for different phoneme embedding 410 and text embedding 412 pairs. For example, the ML model 400 may generate a 1-best phoneme and text embedding 414a corresponding to the first phoneme embedding 410a and the first text embedding 412a for the ASR 1-best hypothesis, a 2-best phoneme and text embedding 414b corresponding to the second phoneme embedding 410b and the second text embedding 412b for the ASR 2-best hypothesis, a n-best phoneme and text embedding 414c corresponding to the third phoneme embedding 410c and the third text embedding 412c for the ASR n-best hypothesis, and a best phoneme and text embedding 414d corresponding to the fourth phoneme embedding 410d and the fourth text embedding 412d for the rewrite.

The phoneme and text embeddings 414 may be input to the pooling layer 416 of the ML model 400. Pooling layers are known in the industry/art, any one of which may be implemented as the pooling layer 416. The pooling layer 416 processes with respect to the input phoneme and text embeddings 414 to reduce dimensions thereof and output a 1-best phoneme and text embedding 418.

The defect attribution component 144 may compare the 1-best phoneme and text embedding 418 to the 1-best phoneme and text embedding 414a generated for the 1-best hypothesis in the ASR n-best list 402. If the defect attribution component 144 determines the 1-best phoneme and text embedding 418 and the 1-best phoneme and text embedding 414a are the same, the defect attribution component 144 may determine ASR processing was not the cause of processing of the user input being defective. Conversely, if the defect attribution component 144 determines the 1-best phoneme and text embedding 418 and the 1-best phoneme and text embedding 414a are different, the defect attribution component 144 may determine ASR processing was the cause of processing of the user input being defective.

Referring again to FIG. 1, the defect component 140 may associate (step 7), in the signals storage 135, the user input identifier (received at step 6) with the value (representing a defectiveness of processing of the user input) determined by the defect analysis component 142, and data representing a cause for defective processing as determined by the defect attribution component 144 (to the extent the defect attribution component 144 determined such, as the defect attribution component 144 may not process if the value output by the defect analysis component 142 indicates processing of the user input was successful).

The defect component 140 may process as described above each time a user input identifier and corresponding data is newly stored in the signals storage 135.

At some point in time, the scheduler component 230, of the labeled data request component 130, may determine, based on the timing data 215, that explicit user feedback is to no longer be requested for a request for labeled data. In response, the scheduler component 230 may send (step 8), to the workflow orchestrator component 145 of the system 120, data representing the ML task(s) (represented in the request data 205 corresponding to the timing data 215 in the labeled data request storage 220).

In response to receiving the data from the scheduler component 230, the workflow orchestrator component 145 may query (step 9) the signals storage 135 for data that is associated with the ML task therein. The data, received by the workflow orchestrator component 145 at step 9, may include various user input identifiers, where each user input identifier is associated with one or more explicit and/or implicit user feedbacks provided with respect to the user input, the value determined by the defect analysis component 142 for the user input identifier, and (potentially) a defect attribution indicator determined by the defect attribution component 144 (where the defect attribution indicator represents the type of processing that caused processing of the user input to be defective). The workflow orchestrator component 145 is configured to determine one or more label generators 150 to generate labeled data for the ML task received at step 8. Each label generator 150 may be configured to generate labeled data for a particular labeling workflow. In some embodiments, a label generator may be trained using historical labels and feedback for a labeling workflow. In some embodiments, a label generator may implement one or more deterministic functions that compute labels based on input parameters. In some embodiments, a label generator may implement one or more deterministic functions assisted by one or more ML models to determine confidence(s) of the deterministic function(s).

The workflow orchestrator component 145 may determine which label generator(s) is to process based on the ML task indicator. For example, a single label generator may be configured to generate labeled data for the ML task. Alternatively, a first label generator may perform a first labeling workflow to generate first labeled data, and the first labeled data may be input to a second label generator to perform a second labeling workflow to generate second labeled data, with the second labeled data corresponding to the labeled data for the ML task requested by the user 107. As an example, one or more label generators 150 may be configured to perform one or more labeling workflows to generate labeled data for training a ML model for speech transcription (i.e., an ASR ML task). As another example, one or more label generators 150 may be configured to perform one or more labeling workflows to generate labeled data for training a ML model for gesture detection processing (i.e., a gesture detection ML task). As a further example, one or more label generators 150 may be configured to perform one or more labeling workflows to generate labeled data for training a ML model to perform intent classification processing (i.e., an intent classification ML task). As another example, one or more label generators 150 may be configured to perform one or more labeling workflows to generate labeled data for training a ML model to perform wakeword detection processing (i.e., a wakeword detection ML task). It will be appreciated that the foregoing examples are merely illustrative, and that other scenarios are envisioned and within the scope of the present disclosure.

The workflow orchestrator component 145 sends (step 10) the data, received at step 9, to one or more label generators 150 depending on the ML task indicated in the data received at step 8. For example, if the ML task is an ASR ML task, the workflow orchestrator component 145 may send the data to one or more label generators configured to perform one or more labeling workflows to generate labeled data for training a ML model to perform ASR processing. The data, sent from the workflow orchestrator component 145 to the label generator(s) 150 may include, for example, an indicator of the ML task, the data used to perform the ML task at runtime, the value representing whether the processing of the user input was successful or defective, the user feedback data upon which the value was determined, and (potentially) and indicator of defective processing output by the defect attribution component 144.

A label generator 150, determined to process by the workflow orchestrator component 145, may process to generate labeled data usable to perform ML training for the ML task. For example, a label generator 150a may be configured to take audio data as input and generate labeled data for performing ASR processing. For further example, a label generator 150b may be configured to take image data as input and generate labeled data for gesture detection processing. In another example, a label generator 150c may be configured to generate take ASR output data (e.g., an ASR hypothesis) as input and generate labeled data for performing intent classification processing. For further example, a label generator 150d may be configured to take NLU output data (e.g., a NLU hypothesis) as input and generate labeled data for determining a skill to process with respect to NLU output data. In another example, a label generator 150e may be configured to take various data as input and generate labeled data for performing sentiment detection processing. For further example, a label generator 150f may be configured to take audio data as input and generate labeled data for performing wakeword detection processing. It will be appreciated that the foregoing examples are merely illustrative, and that other configurations and processing of label generators are envisioned and within the scope of the present disclosure. As a specific example, a label generator for an ASR ML task may be configured as a multi-view multi-task transformer that takes word and phoneme sequences of ASR n-best hypotheses as input, and outputs word sequences and phoneme sequences for rewrites of the ASR n-best hypotheses, where the rewrites correspond to labeled data.

In some instances, the output of one label generator may be an input to another label generator. For example, a first label generator may process first data with respect to a first labeling workflow to generate first labeled data, and a second label generator may process the first labeled data with respect to a second labeling workflow to generate second labeled data that is usable to perform ML training with respect to a ML task.

In addition to generating labeled data, a label generator 150 may determine a value (e.g., confidence value, probability value, etc.) representing whether the labeled data should be considered as a ground truth for training of the ML task.

A label generator 150 stores (step 11), in a labeled data storage 155, an association between an indicator of the ML task, the labeled data generated by the label generator 150 for the ML task, and the value representing whether the labeled data should be considered as a ground truth for training of the ML task. In some embodiments, the label generator 150 may only store the foregoing associated data if the value satisfies a condition (e.g., a threshold confidence value). Additionally or alternatively, an instance of labeled data, in the labeled data storage 155, may be associated with data indicating whether the labeled data was generated using a label generator or manual annotation (as described below).

As described above, the workflow orchestrator component 145 may determine one or more label generators 150 should be used to generate labeled data. In some instances, the workflow orchestrator component 145 may additionally or alternatively determine labeled data should be generated using manual annotation. For example, the workflow orchestrator component 145 may receive data usable to generate labeled data for a particular ML task, determine the ML task does not have a corresponding label generator 150 (e.g., there is no lable generator(s) configured to generate labeled data for the ML task), and based thereon determine the labeled data is to be generated through manual annotation. For further example, the data labeling component may receive a request for labeled data for a specific ML task, where the request indicates the labeled data should be generated through manual annotation. In some instances, a request may indicate the labeled data should be generated through manual annotation based on a concern that labeled data, generated by a label generator 150, may unintentionally introduce bias into ML training. In this scenario, the workflow orchestrator component 145 may determine manual annotation is to be used to generate labeled data based on the request. As another example, the workflow orchestrator component 145 may be configured to receive labeled data and a corresponding confidence value generated by a label generator 150. If the workflow orchestrator component 145 determines the confidence value fails to satisfy a condition (e.g., a threshold confidence value), the workflow orchestrator component 145 may determine the data (processed by the label generator 150 to generate the labeled data and the confidence value) is to undergo manual annotation.

In the foregoing situations, the workflow orchestrator component 145 sends (step 12) data, to undergo manual annotation, to a manual annotation component 160 of the system 120. In sending the data, the workflow orchestrator component 145 may indicate the ML task for which the data is to undergo manual annotation.

The manual annotation component 160 may be configured to send data, received from the workflow orchestrator component 145, to one or more devices of human annotators. For example, each human annotator device identifier may be associated with data representing one or more ML tasks for which the associated human annotator is prepared to manually annotate data for. When the manual annotation component 160 receives data from the workflow orchestrator component 145, the manual annotation component 160 may determine a ML task associated with the received data, determine one or more human annotator device identifiers associated with the ML task, and send the data to one or more devices, corresponding to the one or more human annotator device identifiers, to undergo manual annotation for the ML task.

In response to a human annotator receiving data for manual annotation, the human annotator may manually annotate the data for the specific ML task, resulting in labeled data for the ML task. The human annotator's device sends the labeled data to the manual annotation component 160, which sends (step 13) the labeled data to the labeled data storage 155 for storage. The manual annotation component 160 may cause the labeled data to be associated, in the labeled data storage 155, with data representing the ML task (e.g., ASR processing, gesture detection processing, intent classification processing, skill selection processing, wakeword detection processing, etc.) for which the labeled data is configured. Additionally or alternatively, the manual annotation component 160 may cause the labeled data to be associated, in the labeled data storage 155, with data indicating the labeled data was generated through manual annotation.

In some situations, the labeled data request component 130 may receive a request for labeled data for a specific ML task, where the request indicates a specific budget (e.g., a price, an amount of time to be spent, an amount of resources (e.g., computational resources, human resources, etc.)) for generating the labeled data. In such situations, the workflow orchestrator component 145 may send data to the manual annotation component 160, where the data includes data to be manually annotated and an indication of the budget. The manual annotation component 160 may then process, as described above, to cause the data to be manually annotated. The manual annotation component 160 may track performance of the manual annotation in view of the budget. Once manual annotation has been performed to the extent that the budget has been used, the manual annotation component 160 may send, to the workflow orchestrator component 145, data representing the budget has been used. In response to receiving this data from the manual annotation component 160, the workflow orchestrator component 145 may thereafter cause data, to be labeled, to be sent to one or more of the label generators 150 for processing. As such, the workflow orchestrator component 145 may be configured to cause labeled data, for a ML task, to be generated using both the label generators 150 and the manual annotation component 160.

In some embodiments, the manual annotation component 160 may be used to verify the labeled data generated by a label generator 150. For example, the data, input to the label generator 150, and the labeled data, generated by the label generator 150, may be input to the manual annotation component 160. The manual annotation component 160 may then coordinate with one or more manual annotators to verify the labeled data is corrected based on the input data and the ML task to which the label generator 150 corresponds.

Upon labeled data being generated (for the label data request received at step 1) and stored in the labeled data storage 155, the labeled data may be sent (step 14) to the labeled data request component 130. Thereafter, the labeled data request interface 210 (of the labeled data request component 130) may be used to send (step 15) the labeled data to the device 115. In response to receiving the labeled data, the user 107 may use the labeled data to generate or retrain a runtime ML model using the labeled data.

In some instances, the user 107 may want labeled data to train a ML model(s), but the user 107 may not generate a request for labeled data as described above. As described above, the labeled data storage 155 may store labeled data associated with a ML task for which the labeled data has been generated. As a result, instead of requesting the system 120 to generate new labeled data, the user 107, using the device 115 and via the labeled data request interface 210, may query the labeled data storage 155 for labeled data associated with a ML task(s) therein. In some embodiments, the user 107 may query the labeled data storage 155 for all labeled data corresponding to a skill (irrespective of ML task). In response to the query, the user 107, via the device 115, may receive labeled data associated with the ML task(s) or skill, and the user 107, via the device 115, may thereafter use the labeled data to generate or retrain a ML model.

In some instances, when the labeled data request interface 210 receives request data corresponding to a ML task, the labeled data request component 130 may determine whether the labeled data storage 155 already includes labeled data associated with the ML task. If so, the labeled data request interface 210 may be used to send the labeled data to the device from which the request data was received. If the labeled data request component 130 instead determines the labeled data storage 155 does not yet include labeled data associated with the ML task, the labeled data request component 130 may send data to the user feedback component 125 (step 2 of FIG. 1), resulting in the processing of FIG. 1 described above.

In some embodiments, a label generator 150 may be trained using data generated from one or more manual annotation workflows and data stored in the signals storage 135.

A described herein, labeled data may be generated via manual annotation. The labeled data, generated via manual annotation, along with the input data from which the labeled data was generated, may be used as samples to train (or retrain) a label generator 150.

In some examples, a manual annotation workflow may be used to generate more than one type of label for a given instance of training data. In this instances, a label generator 150 may be trained to generate the more than one type of label. As an example, a manual annotation workflow may be used to label natural language text data with an intent label and a domain label. In this example, positive samples of natural language text with corresponding intent labels (generated through manual annotation) and positive samples of natural language text with corresponding domain labels may be used to train a label generator 150 to generate an intent label and a domain label for a given instance of input data.

In some embodiments, data from the signals storage 135 may also be used to train a label generator 150. For example, the signals storage 135 may be periodically queries for data usable to train a label generator 150 with respect to a specific ML task. Data, corresponding to positive user feedback in the signals storage 135, may be used as a positive sample for ML training. Conversely, data, corresponding to negative user feedback in the signals storage 135, may be used as a negative sample for ML training.

In some embodiments, a label generator 150 may be initially trained using samples from manual annotation, and thereafter periodically updated using samples from the signals storage 135 and optionally further samples from manual annotation.

One or more art-known/industry-known ML training techniques may be used to train a label generator 150. One or more proprietary ML training techniques additionally or alternatively be used to train a label generator 150. In some embodiments, the ML training technique(s) used may depend on the ML task for which the label generator 150 is to be trained.

As described herein, the system 120 may implement various label generators 150, with each being associated with one or more specific ML tasks. As examples, a label generator 150 may be configured to generate labeled data for training a ML model to measure the success of a turn of a dialog; predict the likelihood that the system will generate output data that correctly responds to a user input; perform ASR processing; perform lexicon (or phonetic) transcription for TTS processing (i.e., transcribe natural language data into sounds to pronounce words); annotate the domain, intent, and entity(ies) of a user input; perform entity resolution; annotate the domain, intent, and entity(ies) of output data generated by the system in response to a user input; annotate entities that are referenced indirectly (e.g., with anaphors) in user inputs; perform skill selection; perform wakeword detection; perform sentiment detection of a spoken natural language input; perform sentiment detection of a textual natural language input; perform gesture detection; etc.

Figure 5:
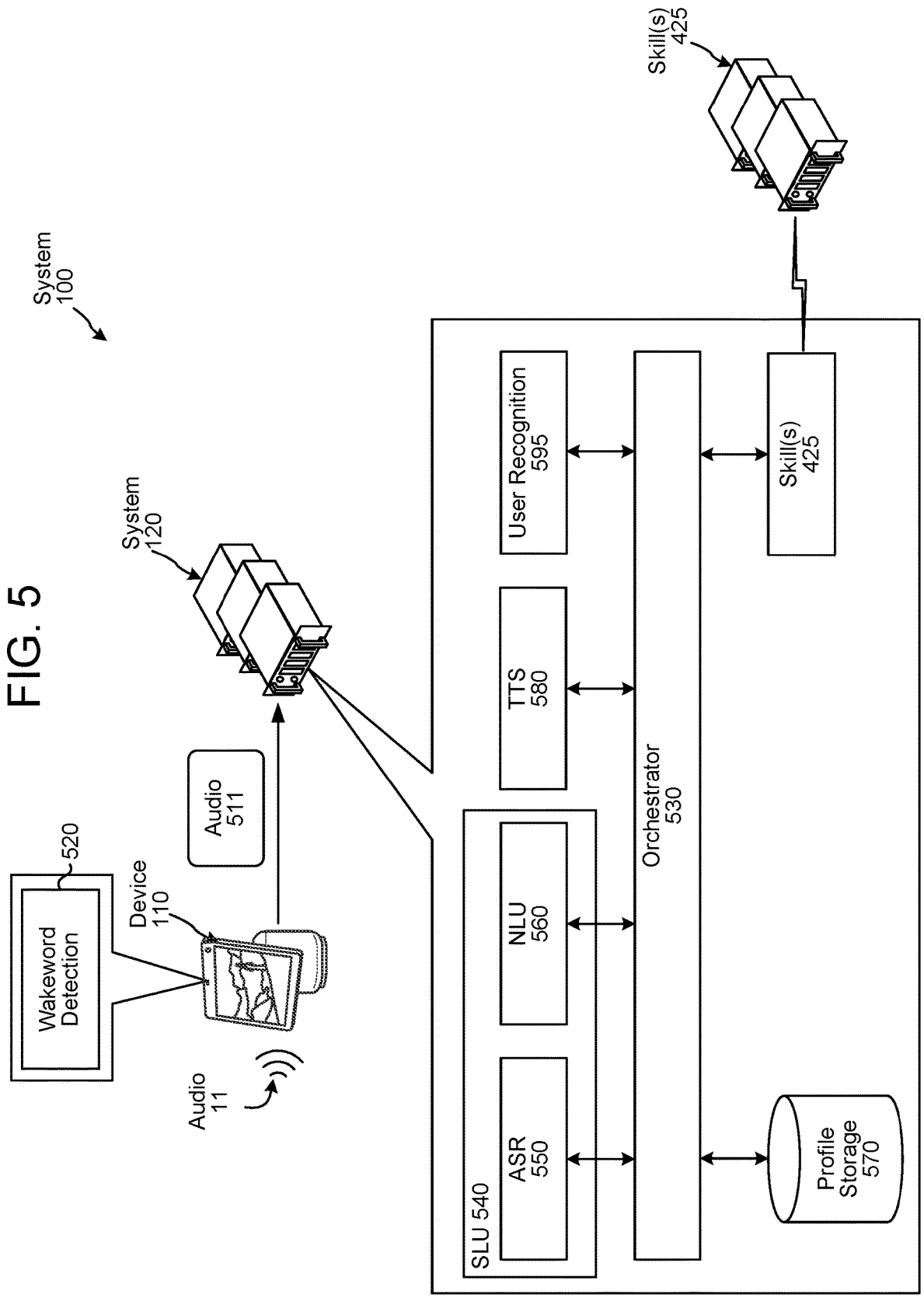
FIG. 5 is a conceptual diagram of components of a system, according to embodiments of the present disclosure.

The system 100 may operate using various components other components, as illustrated in FIG. 5. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 520 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 520 detects a wakeword, the device 110 may "wake" and begin transmitting audio data 511, representing the audio 11, to the system 120. The audio data 511 may include the detected wakeword, or the device 110 may remove the portion of the audio data, corresponding to the detected wakeword, prior to sending the audio data 511 to the system 120.

The system 120 may include an orchestrator component 530 configured to, among other things, coordinate data transmissions between components of the system 120. The orchestrator component 530 may receive the audio data 511 from the device 110, and send the audio data 511 to an ASR component 550.

The ASR component 550 transcribes the audio data 511 into ASR output data including one or more ASR hypotheses. An ASR hypothesis may be configured as a textual interpretation of the speech in the audio data 511, or may be configured in another manner, such as one or more tokens. Each ASR hypothesis may represent a different likely interpretation of the speech in the audio data 511. Each ASR hypothesis may be associated with a score (e.g., confidence score, probability score, or the like) representing the associated ASR hypothesis correctly represents the speech in the audio data 511.

The ASR component 550 interprets the speech in the audio data 511 based on a similarity between the audio data 511 and pre-established language models. For example, the ASR component 550 may compare the audio data 511 with models for sounds (e.g., subword units, such as phonemes, etc.) and sequences of sounds to identify words that match the sequence of sounds of the speech represented in the audio data 511.

In at least some instances, instead of the device 110 receiving a spoken natural language input, the device 110 may receive a textual (e.g., typed) natural language input. The device 110 may determine text data representing the textual natural language input, and may send the text data to the system 120, wherein the text data is received by the orchestrator component 530. The orchestrator component 530 may send the text data or ASR output data, depending on the type of natural language input received, to a NLU component 560.

The NLU component 560 processes the ASR output data or text data to determine one or more NLU hypotheses embodied in NLU output data. The NLU component 560 may perform intent classification (IC) processing on the ASR output data or text data to determine an intent of the natural language input. An intent corresponds to an action to be performed that is responsive to the natural language input. To perform IC processing, the NLU component 560 may communicate with a database of words linked to intents. For example, a music intent database may link words and phrases such as "quiet," "volume off," and "mute" to a <Mute>intent. The NLU component 560 identifies intents by comparing words and phrases in ASR output data or text data to the words and phrases in an intents database. In some embodiments, the NLU component 560 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 560 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 560 may be linked to one or more grammar frameworks with entity types to be populated with entity values. Each entity type of a grammar framework corresponds to a portion of ASR output data or text data that the NLU component 560 believes corresponds to an entity value. For example, a grammar framework corresponding to a <PlayMusic>intent may correspond to sentence structures such as "Play {Artist Name}," "Play {Album Name}," "Play {Song name}," "Play {Song name} by {Artist Name}," etc.

For example, the NLU component 560 may perform NER processing to identify words in ASR output data or text data as subject, object, verb, preposition, etc. based on grammar rules and/or models. Then, the NLU component 560 may perform IC processing using the identified verb to identify an intent. Thereafter, the NLU component 560 may again perform NER processing to determine a grammar model associated with the identified intent. For example, a grammar model for a <PlayMusic>intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic>intent.

The NLU component 560 may generate NLU output data including one or more NLU hypotheses, with each NLU hypothesis including an intent and optionally one or more entity types and corresponding entity values. In some embodiments, the NLU component 560 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 550 and the NLU component 560). In at least some embodiments, the system 120 may implement a spoken language understanding (SLU) component 540 configured to process audio data 511 to determine NLU output data.

The SLU component 540 may be equivalent to a combination of the ASR component 550 and the NLU component 560. Yet, the SLU component 540 may process audio data 511 and directly determine the NLU output data, without an intermediate step of generating ASR output data. As such, the SLU component 540 may take audio data 511 representing a spoken natural language input and attempt to make a semantic interpretation of the spoken natural language input. That is, the SLU component 540 may determine a meaning associated with the spoken natural language input and then implement that meaning. For example, the SLU component 540 may interpret audio data 511 representing a spoken natural language input in order to derive a desired action. The SLU component 540 may output a most likely NLU hypothesis, or multiple NLU hypotheses associated with respective confidence or other scores (such as probability scores, etc.).

The system 120 may include a gesture detection component (not illustrated in FIG. 5). The system 120 may receive image data representing a gesture, the gesture detection component may process the image data to determine a gesture represented therein. The gesture detection component may implement art-known/industry-known gesture detection processes.

In embodiments where the system 120 receives non-image data (e.g., text data) representing a gesture, the orchestrator component 530 may be configured to determine what downstream processing is to be performed in response to the gesture.

In embodiments where the system 120 data representing a selected GUI element, the orchestrator component 530 may be configured to determine what downstream processing is to be performed in response to the GUI element selection.

The system 120 may include or otherwise communicate with one or more skills 525. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic>intent, an "artist" entity type, and an artist name as an entity value, a music skill may be called to output music sung by the indicated artist. For further example, for NLU output data including a <TurnOn>intent, a "device" entity type, and an entity value of "lights," a smart home skill may be called to cause one or more "smart" lights to operate in an "on" state. In another example, for NLU output data including an <OutputWeather>intent, a "location" entity type, and an entity value corresponding to a geographic location of the device 110, a weather skill may be called to output weather information for the geographic location. For further example, for NLU output data including a <BookRide>intent, a taxi skill may be called to book a requested ride. In another example, for NLU output data including a <BuyPizza>intent, a restaurant skill may be called to place an order for a pizza.

A skill 525 may operate in conjunction between the system 120 and other devices, such as the device 110, a restaurant electronic ordering system, a taxi electronic booking system, etc. in order to complete certain functions. Inputs to a skill 525 may come from speech processing interactions or through other interactions or input sources.

A skill 525 may be associated with a domain, a non-limiting list of which includes a smart home domain, a music domain, a video domain, a weather domain, a communications domain, a flash briefing domain, a shopping domain, and a custom domain.

The system 120 may include a TTS component 580 that generates audio data including synthesized speech. The data input to the TTS component 580 may come from a skill 525, the orchestrator component 530, or another component of the system 120.

In one method of synthesis called unit selection, the TTS component 580 matches input data against a database of recorded speech. The TTS component 580 selects matching units of recorded speech and concatenates the units together to form audio data. In another method of synthesis called parametric synthesis, the TTS component 580 varies parameters such as frequency, volume, and noise to determine audio data including an artificial speech waveform. Parametric synthesis uses a computerized voice generator, sometimes called a vocoder.

The system 120 may include a user recognition component 595. The user recognition component 595 may recognize one or more users using various data. The user recognition component 595 may take as input the audio data 511. The user recognition component 595 may perform user recognition by comparing speech characteristics, in the audio data 511, to stored speech characteristics of users. The user recognition component 595 may additionally or alternatively perform user recognition by comparing biometric data (e.g., fingerprint data, iris data, retina data, etc.), received by the system 120 in correlation with a natural language input, to stored biometric data of users. The user recognition component 595 may additionally or alternatively perform user recognition by comparing image data (e.g., including a representation of at least a feature of a user), received by the system 120 in correlation with a natural language input, with stored image data including representations of features of different users. The user recognition component 595 may perform other or additional user recognition processes, including those known in the art. For a particular natural language input, the user recognition component 595 may perform processing with respect to stored data of users associated with the device 110 that received the natural language input.

The user recognition component 595 determines whether a natural language input originated from a particular user. For example, the user recognition component 595 may determine a first value representing a likelihood that a natural language input originated from a first user, a second value representing a likelihood that the natural language input originated from a second user, etc. The user recognition component 595 may also determine an overall confidence regarding the accuracy of user recognition processing.

The user recognition component 595 may output a single user identifier corresponding to the most likely user that originated the natural language input. Alternatively, the user recognition component 595 may output multiple user identifiers (e.g., in the form of an N-best list) with respective values representing likelihoods of respective users originating the natural language input. The output of the user recognition component 595 may be used to inform NLU processing, processing performed by a skill 525, as well as processing performed by other components of the system 120 and/or other systems.

The system 120 may include profile storage 570. The profile storage 570 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 570 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 525 that the user has enabled. When a user enables a skill 525, the user is providing the system 120 with permission to allow the skill 525 to execute with respect to the user's natural language inputs. If a user does not enable a skill 525, the system 120 may not execute the skill 525 with respect to the user's natural language inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 570 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 6:
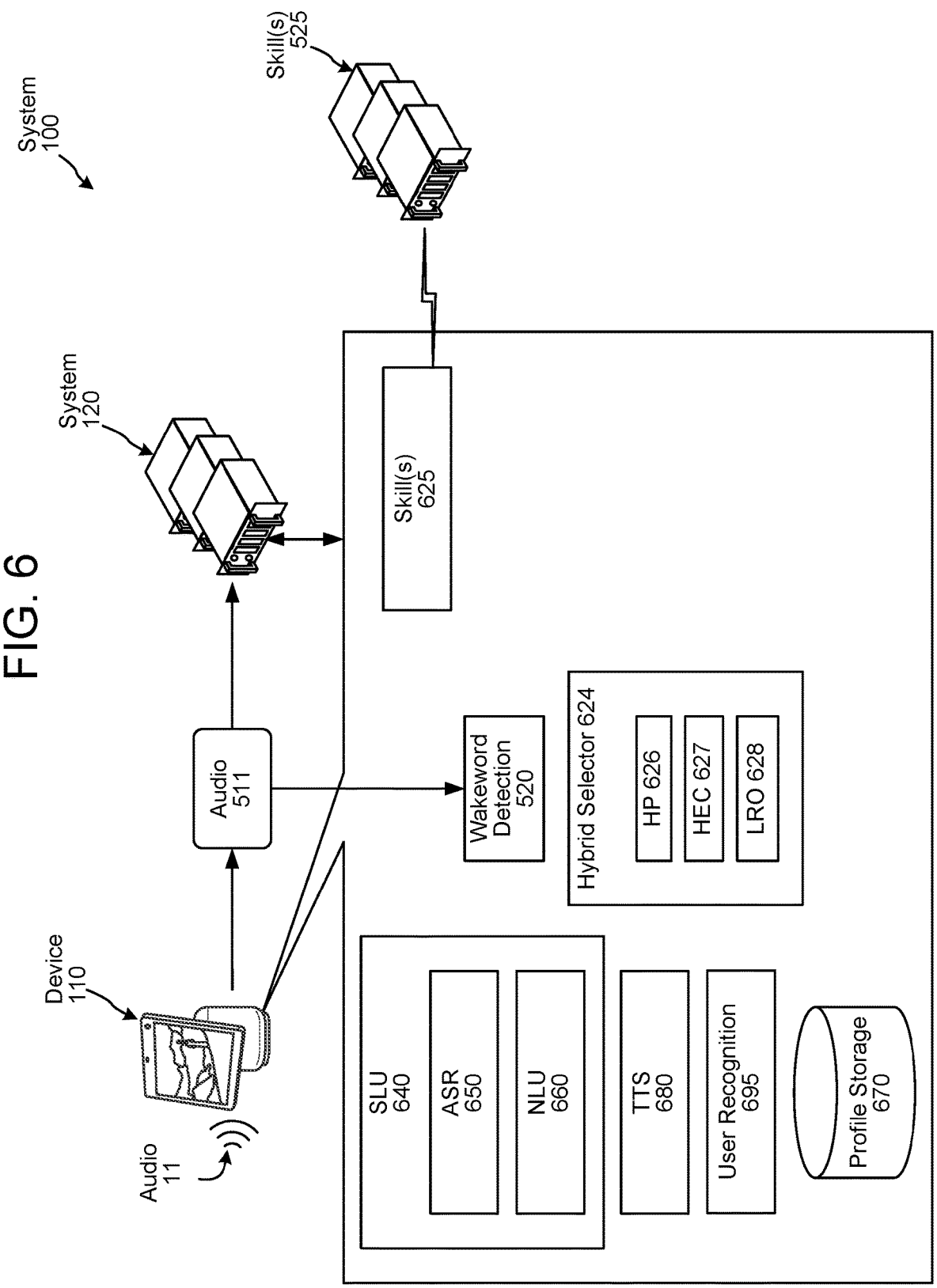
FIG. 6 is a conceptual diagram illustrating components that may be included in a device, according to embodiments of the present disclosure.

The foregoing describes illustrative components and processing of the system 120. The following describes illustrative components and processing of the device 110. As illustrated in FIG. 6, in at least some embodiments the system 120 may receive the audio data 511 from the device 110, to recognize speech corresponding to a spoken natural language in the received audio data 511, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted with respect to FIG. 5, the device 110 may include a wakeword detection component 520 configured to used to detect a wakeword (e.g., "Alexa") that indicates to the device 110 that the audio data 511 is to be processed for determining NLU output data. In at least some embodiments, a hybrid selector 624, of the device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the system 120 and/or an ASR component 650. The wakeword detection component 520 may also send an indication, to the hybrid selector 624, representing a wakeword was not detected. In response to receiving such an indication, the hybrid selector 624 may refrain from sending the audio data 511 to the system 120, and may prevent the ASR component 650 from processing the audio data 511. In this situation, the audio data 511 can be discarded.

The device 110 may conduct its own speech processing using on-device language processing components (such as a SLU component 640, an ASR component 650, and/or a NLU component 660) similar to the manner discussed above with respect to the SLU component 540, ASR component 550, and NLU component 560. The device 110 may also internally include, or otherwise have access to, other components such as one or more skills 625, a user recognition component 695 (configured to process in a similar manner to the user recognition component 595 implemented by the system 120), a TTS component 680 (configured to process in a similar manner to the TTS component 580 implemented by the system 120), profile storage 670 (configured to store similar profile data to the profile storage 570 implemented by the system), a gesture detection component (similar to that of the system 120 described above), the user feedback component 125, the labeled data request component 130, the defect component 140, the signals storage 135, the workflow orchestrator component 145, the label generator(s) 150, the manual annotation component 160, the labeled data storage 155, and/or other components. In at least some embodiments, the profile storage 670 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 511 to pass to the system 120 while also receiving (e.g., intercepting) this audio data 511 and sending the audio data 511 to the HEC 627.

In at least some embodiments, the hybrid selector 624 may further include a local request orchestrator (LRO) 628 configured to notify the ASR component 650 about the availability of the audio data 511, and to otherwise initiate the operations of on-device language processing when the audio data 511 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 511 is received, the HP 626 may allow the audio data 511 to pass through to the system 120 and the HP 626 may also input the audio data 511 to the ASR component 650 by routing the audio data 511 through the HEC 627 of the hybrid selector 624, whereby the LRO 628 notifies the ASR component 650 of the audio data 511. At this point, the hybrid selector 624 may wait for response data from either or both the system 120 and/or the on-device language processing components. However, the disclosure is not limited thereto, and in some examples the hybrid selector 624 may send the audio data 511 only to the ASR component 650 without departing from the disclosure. For example, the device 110 may process the audio data 511 on-device without sending the audio data 511 to the system 120.

The ASR component 650 is configured to receive the audio data 511 from the hybrid selector 624, and to recognize speech in the audio data 511, and the NLU component 660 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the NLU component 660) may be selected as usable to respond to a natural language input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 511 to the system 120, and the response data from the system 120 may include the unique identifier to identify to which natural language input the response data corresponds.

In at least some embodiments, the device 110 may include one or more skills 625 that may process similarly to the system-implemented skill(s) 525. The skill(s) 625 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 7:
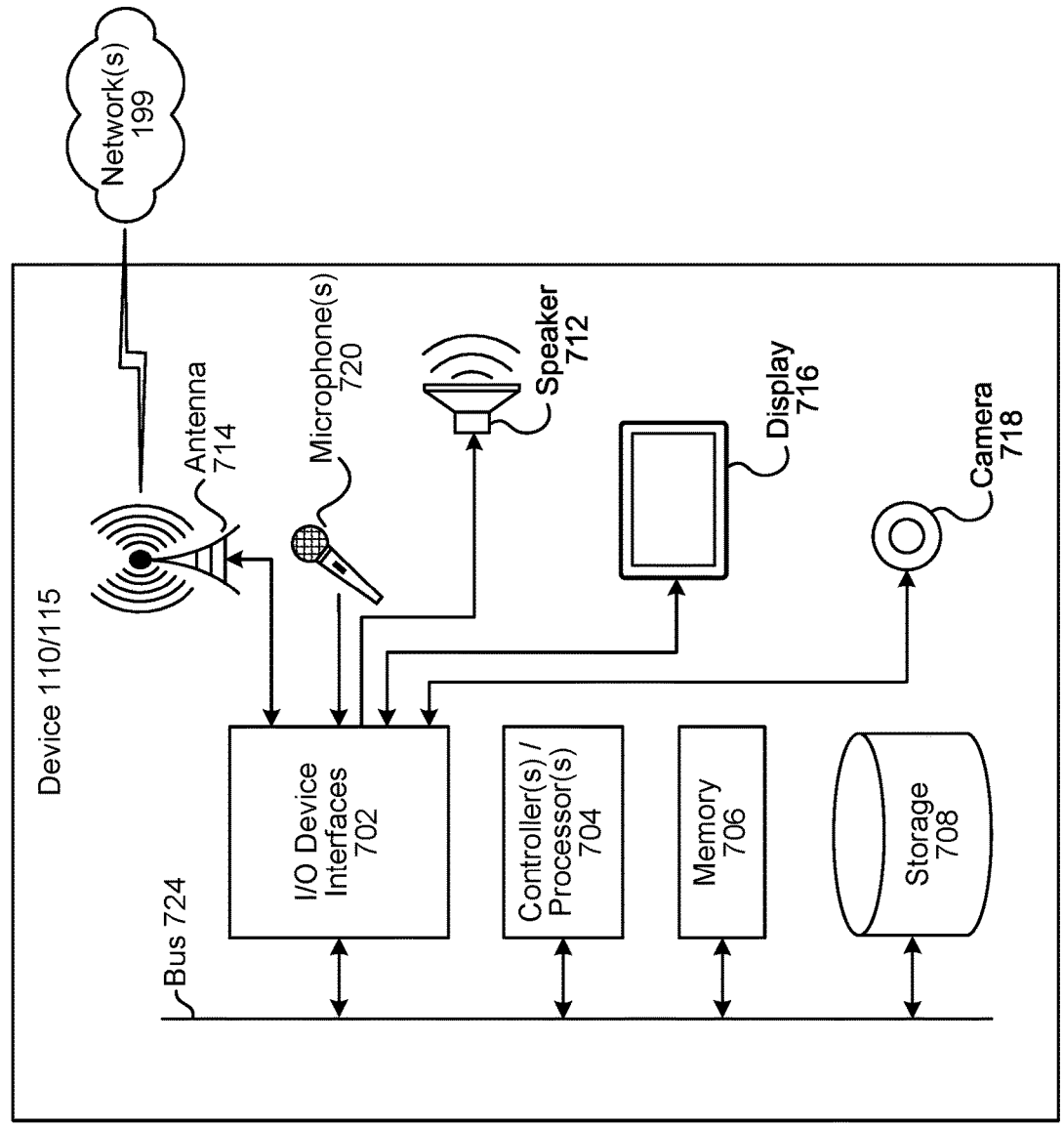
FIG. 7 is a block diagram conceptually illustrating example components of a device, according to embodiments of the present disclosure.
Figure 8:
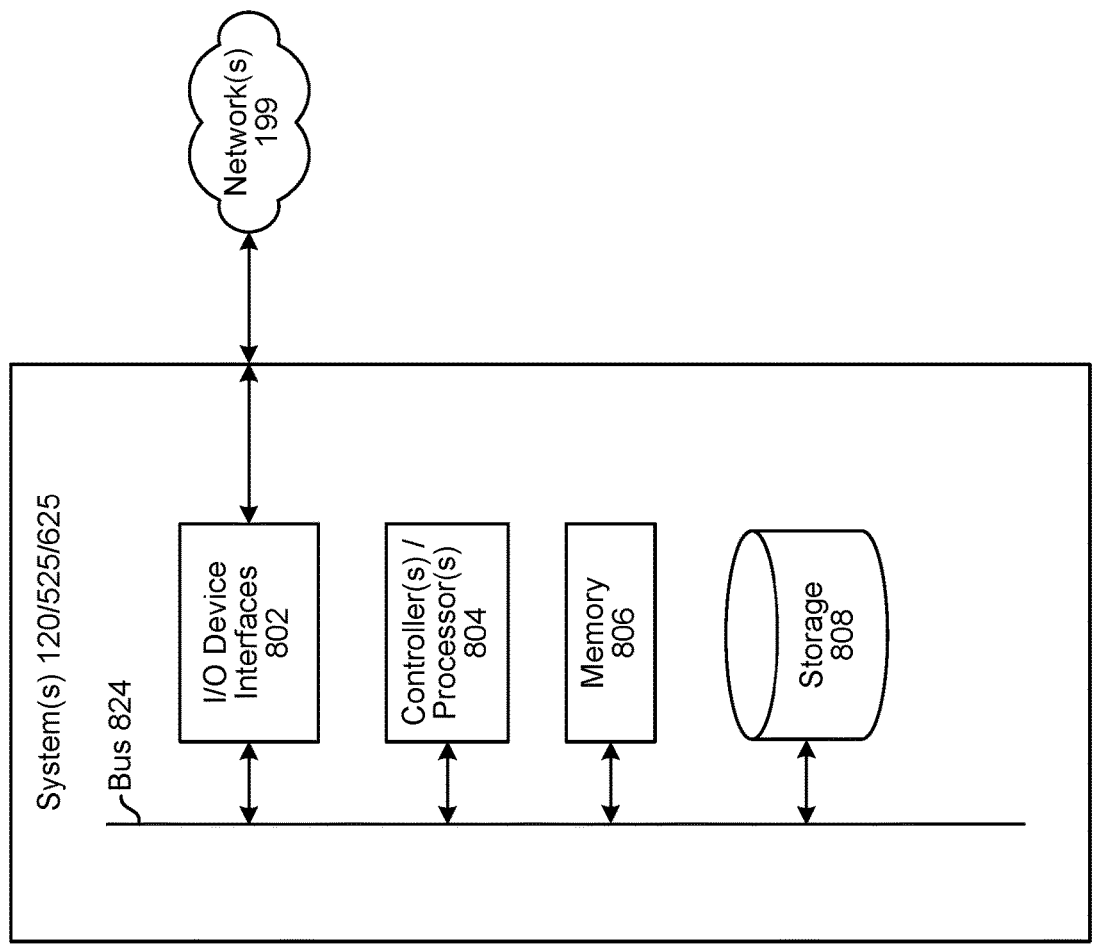
FIG. 8 is a block diagram conceptually illustrating example components of a system, according to embodiments of the present disclosure.

FIG. 7 is a block diagram conceptually illustrating a device 110 that may be used with the system 120. FIG. 8 is a block diagram conceptually illustrating example components of a remote device, such as the system 120 or a skill 525/625. A system (120/525/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/525/625) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/525/625) may be included in the system 100 of the present disclosure, such as one or more systems 120 and/or one or more skills 425. In operation, each of these systems may include computer-readable and computer-executable instructions that reside on the respective device (120/525/625), as will be discussed further below.

Each of these devices (110/120/525/625) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/525/625) may also include a data storage component (708/808) for storing data and controller/processor-executable instructions. Each data storage component (708/808) may individually include one or more non-volatile storage types such as magnetic storage, optical storage, solid-state storage, etc. Each device (110/120/525/625) may also be connected to removable or external non-volatile memory and/or storage (such as a removable memory card, memory key drive, networked storage, etc.) through respective input/output device interfaces (702/802).

Computer instructions for operating each device (110/120/525/625) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/525/625) includes input/output device interfaces (702/802). A variety of components may be connected through the input/output device interfaces (702/802), as will be discussed further below. Additionally, each device (110/120/525/625) may include an address/data bus (724/824) for conveying data among components of the respective device. Each component within a device (110/120/525/625) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, the skill 425, and/or the skill 525/625 may include their own dedicated processors, memory, and/or storage. Alternatively, one or more of the components of the device 110, the system 120, and/or the skill 525/625 may utilize the I/O interfaces (702/802), processor(s) (704/804), memory (706/806), and/or storage (708/808) of the device 110, the system 120, or the skill 525/625, respectively. Thus, the ASR component 550/650 may have its own I/O interface(s), processor(s), memory, and/or storage; the NLU component 560/660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 525/625, as described herein, are illustrative, and may be located as a stand-alone device or may be included, in whole or in part, as a component of a larger device or system.

As illustrated in FIG. 9, multiple devices (110a-110j, 120, 525/625) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 525/625, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first data requesting labeled data for updating an automatic speech recognition (ASR) model;
determining the first data includes a prompt for requesting user feedback relating to processing performed by the ASR model;
causing a device to output the prompt to request first user feedback with respect to processing of a spoken natural language input by the ASR model;
receiving, from the device, first user feedback data representing a first frustration with respect to processing of the spoken natural language input by the ASR model;
determining, based on the first frustration, that processing of the spoken natural language input by the ASR model resulted in incorrect output data being presented in response to the spoken natural language input;

determining an ASR hypothesis generated by the ASR model for the spoken natural language input;

selecting, from a plurality of ML models configured to generate labeled data, a first ML model configured to perform a first labeling workflow relating to an ASR task performable by the ASR model; and generating, using the first ML model, first labeled data usable to update the ASR model, the first ML model generating the first labeled data using the first user feedback data and the ASR hypothesis.

2. The computer-implemented method of claim 1, further comprising:

selecting, from the plurality of ML models, a second ML model configured to perform a second labeling workflow relating to the ASR task, the second labeling workflow being different than the first labeling workflow, an output of the second labeling workflow corresponding to an input of the first labeling workflow;

processing, using the second ML model, the first user feedback data to generate second labeled data; and processing, using the first ML model, the ASR hypothesis, the first user feedback data, and the second labeled data to generate the first labeled data.

3. The computer-implemented method of claim 1, further comprising:

determining, by the first ML model, second labeled data usable to update the ASR model, the first ML model generating the second labeled data using second user feedback data;

determining, by the first ML model, a value representing the second labeled data corresponds to a ground truth for updating the first ML model; and determining, based on the value, that the second labeled data is to be deleted and manual annotation is to be used to generate third labeled data based on the second user feedback data, the third labeled data being usable to update the ASR model.

4. The computer-implemented method of claim 1, wherein the first data further includes a duration of time that user feedback is to be requested using the prompt, and the computer-implemented method further comprises:

determining the duration of time has elapsed; and generating the first labeled data using the first ML model after determining the duration of time has elapsed.

5. A computer-implemented method comprising:

receiving first data requesting labeled data for updating a first machine learning (ML) model, the first data including a prompt for requesting user feedback relating to processing of the first ML model;

causing a device to output the prompt to request first user feedback with respect to processing of a user input by first ML model;

receiving, from the device, first user feedback data corresponding to the first user feedback;

determining, based at least in part on the first user feedback data, that processing of the user input by the first ML model resulted in incorrect output data being presented in response to the user input; and generating, using a second ML model, first labeled data usable to update the first ML model, the second ML model generating the first labeled data based at least in part on the first user feedback data.

6. The computer-implemented method of claim 5, further comprising:

determining second data is to be used to perform training with respect to a ML task;

determining an absence of a third ML model configured to label data for the ML task; and determining the second data is to undergo manual annotation based at least in part on determining the absence of the third ML model.

7. The computer-implemented method of claim 5, further comprising:

processing, using a third ML model, the first user feedback data to generate second labeled data; and processing, using the second ML model, the second labeled data to generate the first labeled data.

8. The computer-implemented method of claim 5, wherein the first data indicates a ML task performable by the first ML model, and the computer-implemented method further comprises:

storing, based at least in part on the first user feedback data being received in response to the prompt included in the first data, an association between the first user feedback data and the ML task; and determining, based at least in part on the association, that processing of the user input by the first ML model resulted in the incorrect output data being presented.

9. The computer-implemented method of claim 5, wherein the first data indicates a ML task performable by the first ML model, and the computer-implemented method further comprises:

determining, by the second ML model, a value representing the first labeled data corresponds to a ground truth for updating the first ML model; and storing, based at least in part on the value, the first labeled data for use in updating the first ML model.

10. The computer-implemented method of claim 5, further comprising:

determining, by the second ML model, second labeled data usable to update the first ML model, the second ML model generating the second labeled data based at least in part on second user feedback data;

determining, by the second ML model, a value representing the second labeled data corresponds to a ground truth for updating the first ML model; and determining, based at least in part on the value, that manual annotation is to be used to generate the second labeled data based at least in part on the second user feedback data.

11. The computer-implemented method of claim 5, further comprising:

receiving second data requesting labeled data for updating a third ML model configured to perform a ML task;

determining, in storage, second labeled data corresponding to the ML task, the second labeled data being previously generated by a fourth ML model in response to a previous request for labeled data corresponding to the ML task; and outputting the second labeled data.

12. The computer-implemented method of claim 5, wherein the first data further includes a duration of time that user feedback is to be requested using the prompt, and the computer-implemented method further comprises:

determining the duration of time has elapsed; and generating the first labeled data using the second ML model after determining the duration of time has elapsed.

13. A computing system comprising:
at least one processor; and
at least one memory comprising instructions that, when executed by the at least one processor, cause the computing system to:
receive first data requesting labeled data for updating a first machine learning (ML) model, the first data including a prompt for requesting user feedback relating to processing of the first ML model;
cause a device to output the prompt to request first user feedback with respect to processing of a user input by first ML model;
receive, from the device, first user feedback data corresponding to the first user feedback;
determine, based at least in part on the first user feedback data, that processing of the user input by the first ML model resulted in incorrect output data being presented in response to the user input; and
generate, using a second ML model, first labeled data usable to update the first ML model, the second ML model generating the first labeled data based at least in part on the first user feedback data.

14. The computing system of claim 13, wherein the at least one memory further comprises instructions that, when executed by the at least one processor, further cause the computing system to:
determine second data is to be used to perform training with respect to a ML task;
determine an absence of a third ML model configured to label data for the ML task; and
determine the second data is to undergo manual annotation based at least in part on determining the absence of the third ML model.

15. The computing system of claim 13, wherein the at least one memory further comprises instructions that, when executed by the at least one processor, further cause the computing system to:
process, using a third ML model, the first user feedback data to generate second labeled data; and
process, using the second ML model, the second labeled data to generate the first labeled data.

16. The computing system of claim 13, wherein the first data indicates a ML task performable by the first ML model, and wherein the at least one memory further comprises instructions that, when executed by the at least one processor, further cause the computing system to:
store, based at least in part on the first user feedback data being received in response to the prompt included in the first data, an association between the first user feedback data and the ML task; and
determine, based at least in part on the association, that processing of the user input by the first ML model resulted in the incorrect output data being presented.

17. The computing system of claim 13, wherein the first data indicates a ML task performable by the first ML model, and wherein the at least one memory further comprises instructions that, when executed by the at least one processor, further cause the computing system to:
determine, by the second ML model, a value representing the first labeled data corresponds to a ground truth for updating the first ML model; and
store, based at least in part on the value, the first labeled data for use in updating the first ML model.

18. The computing system of claim 13, wherein the at least one memory further comprises instructions that, when executed by the at least one processor, further cause the computing system to:
determine, by the second ML model, second labeled data usable to update the first ML model, the second ML model generating the second labeled data based at least in part on second user feedback data;
determine, by the second ML model, a value representing the second labeled data corresponds to a ground truth for updating the first ML model; and
determine, based at least in part on the value, that manual annotation is to be used to generate the second labeled data based at least in part on the second user feedback data.

19. The computing system of claim 13, wherein the at least one memory further comprises instructions that, when executed by the at least one processor, further cause the computing system to:
receive second data requesting labeled data for updating a third ML model configured to perform a ML task;
determine, in storage, second labeled data corresponding to the ML task, the second labeled data being previously generated by a fourth ML model in response to a previous request for labeled data corresponding to the ML task; and
output the second labeled data.

20. The computing system of claim 13, wherein the first data further includes a duration of time that user feedback is to be requested using the prompt, and wherein the at least one memory further comprises instructions that, when executed by the at least one processor, further cause the computing system to:
determine the duration of time has elapsed; and
generate the first labeled data using the second ML model after determining the duration of time has elapsed.

* * * * *